INVENTORS
GLENMORE L. SHELTON JR.
LAWRENCE P. HORWITZ
BY
Francis J. Thomas
ATTORNEY

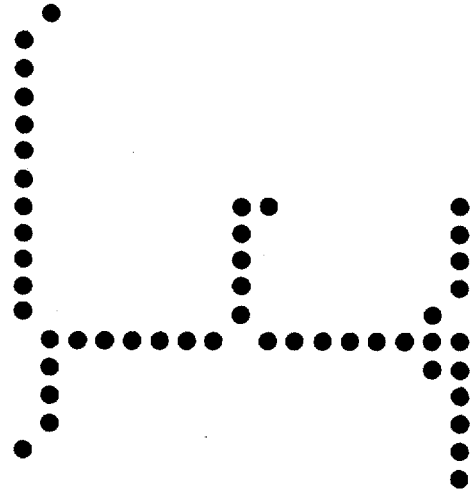
FIG. 3  OUTPUT PATTERN
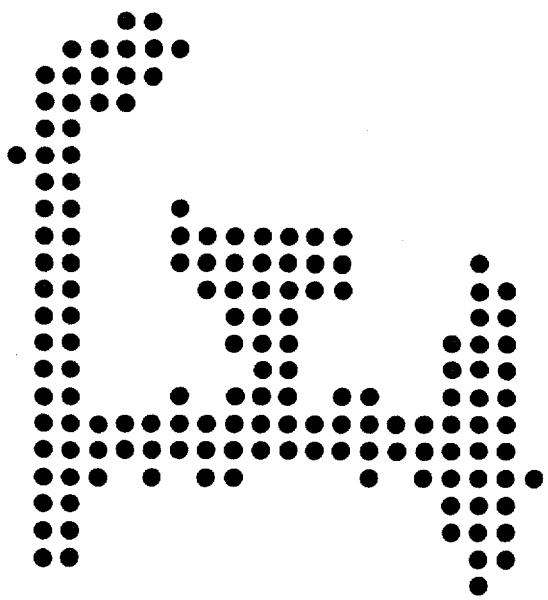
FIG. 2  INPUT SPECIMEN f(x,y)

FIG. 4a

| | | | | | | | | | | | | | | | 1 | | | | |
|--|--|--|--|--|--|--|--|--|--|--|--|--|--|--|--|--|--|--|--|
| | 2 | 3 | 3 | 3 | 3 | 3 | 3 | 3 | 3 | 3 | 3 | 3 | 3 | 3 | 4 | 3 | 3 | 2 | |
| | 2 | 3 | 3 | 4 | 4 | 4 | 3 | 3 | 3 | 3 | 3 | 3 | 3 | 3 | 3 | 3 | 4 | 4 | 2 |
| | | | | 2 | 4 | 3 | | | | | | | | | | | 3 | 4 | 3 |
| | | | | 3 | 3 | | | | | | | | | | | 2 | 4 | 4 | 2 |
| | | | 1 | 4 | 3 | | | | | | | | | | | 2 | 4 | 2 | |
| | | | | 3 | 4 | 1 | | | | 2 | 3 | 1 | | | | | 1 | | |
| | | | 2 | 4 | 3 | | | | 2 | 4 | 3 | | | | | | | | |
| | | | 2 | 4 | 4 | 2 | | 2 | 3 | 4 | 4 | 3 | | | | | | | |
| | | | | 3 | 4 | 4 | 3 | 4 | 4 | 4 | 4 | 3 | | | | | | | |
| | | | | 3 | 4 | 3 | 3 | 3 | 3 | 4 | 4 | 3 | | | | | | | |
| | | | | 3 | 3 | | | | 3 | 4 | 3 | | | | | | | | |
| | | | | 3 | 4 | 2 | | | 2 | 3 | 2 | | | | | | | | |
| | | | 1 | 4 | 4 | 2 | | | | | | | | | | | | | |
| | | | | 3 | 3 | | | | | | | | | | | | | | |
| | | | 2 | 4 | 3 | | | | | | | | | | | | | | |
| | | 2 | 3 | 4 | 4 | 4 | 3 | 3 | 2 | | | | | | | | | | |
| 1 | 3 | 4 | 4 | 4 | 4 | 4 | 4 | 4 | 4 | 3 | 3 | 1 | | | | | | | |
| | 2 | 3 | 3 | 4 | 3 | 3 | 3 | 3 | 3 | 3 | 2 | | | | | | | | |
| | | | | 1 | | | | | | | | | | | | | | | |

|  |  |  |  |  |  |  |  |  |  |  |  |  |  |  | 4 |  |  |  |  |
|---|---|---|---|---|---|---|---|---|---|---|---|---|---|---|---|---|---|---|---|
|  | 5 | 8 | 9 | 10 | 10 | 10 | 9 | 9 | 9 | 9 | 9 | 9 | 9 | 9 | 10 | 10 | 10 | 9 | 7 |
|  | 5 | 8 | 10 | 12 | 15 | 13 | 10 | 9 | 9 | 9 | 9 | 9 | 9 | 9 | 10 | 10 | 13 | 12 | 7 |
|  |  |  | 8 | 12 | 11 |  |  |  |  |  |  |  |  |  |  |  | 10 | 14 | 10 |
|  |  |  |  | 11 | 9 |  |  |  |  |  |  |  |  |  |  |  | 7 | 12 | 13 | 6 |
|  |  |  | 4 | 10 | 11 |  |  |  |  |  |  |  |  |  |  |  |  | 8 | 9 | 6 |
|  |  |  |  | 12 | 10 | 4 |  |  |  | 7 | 6 | 3 |  |  |  |  |  | 4 |  |
|  |  |  | 6 | 12 | 12 |  |  |  | 8 | 11 | 10 |  |  |  |  |  |  |  |  |
|  |  |  | 6 | 13 | 13 | 8 |  | 7 | 10 | 13 | 15 | 10 |  |  |  |  |  |  |  |
|  |  |  |  | 11 | 15 | 12 | 11 | 12 | 14 | 16 | 15 | 10 |  |  |  |  |  |  |  |
|  |  |  |  | 10 | 13 | 11 | 9 | 10 | 11 | 14 | 15 | 10 |  |  |  |  |  |  |  |
|  |  |  |  | 9 | 11 |  |  |  | 10 | 13 | 9 |  |  |  |  |  |  |  |  |
|  |  |  |  | 11 | 12 | 6 |  |  | 6 | 8 | 6 |  |  |  |  |  |  |  |  |
|  |  |  | 4 | 11 | 13 | 6 |  |  |  |  |  |  |  |  |  |  |  |  |  |
|  |  |  |  | 11 | 10 |  |  |  |  |  |  |  |  |  |  |  |  |  |  |
|  |  |  | 8 | 12 | 11 |  |  |  |  |  |  |  |  |  |  |  |  |  |  |
|  |  | 7 | 10 | 13 | 16 | 14 | 11 | 9 | 7 |  |  |  |  |  |  |  |  |  |  |
| 3 | 7 | 12 | 14 | 16 | 15 | 15 | 14 | 14 | 12 | 10 | 6 | 3 |  |  |  |  |  |  |  |
|  | 6 | 9 | 11 | 11 | 11 | 10 | 10 | 10 | 10 | 8 | 6 |  |  |  |  |  |  |  |  |
|  |  |  | 4 |  |  |  |  |  |  |  |  |  |  |  |  |  |  |  |  |

| | | | | | | | | | | | | | | | 10 | | | | |
|---|---|---|---|---|---|---|---|---|---|---|---|---|---|---|---|---|---|---|---|
| 13 | 22 | 28 | 31 | 35 | 32 | 29 | 27 | 27 | 27 | 27 | 27 | 27 | 28 | 28 | 34 | 29 | 30 | 21 | |
| 13 | 23 | 29 | 43 | 47 | 46 | 31 | 28 | 27 | 27 | 27 | 27 | 27 | 27 | 29 | 29 | 33 | 41 | 41 | 22 |
| | | | 24 | 45 | 34 | | | | | | | | | | | | 34 | 44 | 34 |
| | | | | 31 | 33 | | | | | | | | | | | | 22 | 42 | 37 | 19 |
| | | | | 10 | 38 | 29 | | | | | | | | | | | | 21 | 31 | 15 |
| | | | | | 32 | 39 | 10 | | | | 17 | 20 | 6 | | | | | | 9 | |
| | | | | | 18 | 43 | 35 | | | | 24 | 40 | 27 | | | | | | | |
| | | | | | 19 | 42 | 48 | 25 | | 22 | 34 | 49 | 49 | 35 | | | | | | |
| | | | | | | 38 | 49 | 45 | 33 | 42 | 49 | 56 | 56 | 35 | | | | | | |
| | | | | | | 33 | 47 | 34 | 32 | 32 | 38 | 52 | 52 | 34 | | | | | | |
| | | | | | | 32 | 34 | | | | 33 | 42 | 29 | | | | | | | |
| | | | | | | 32 | 41 | 18 | | | 18 | 25 | 17 | | | | | | | |
| | | | | | 11 | 39 | 39 | 19 | | | | | | | | | | | | |
| | | | | | | 33 | 35 | | | | | | | | | | | | | |
| | | | | | 25 | 46 | 36 | | | | | | | | | | | | | |
| | 22 | 34 | 50 | 54 | 53 | 37 | 32 | 21 | | | | | | | | | | | | |
| 7 | 21 | 37 | 49 | 53 | 58 | 53 | 50 | 45 | 41 | 26 | 19 | 6 | | | | | | | | |
| | 16 | 29 | 34 | 42 | 36 | 36 | 34 | 34 | 30 | 26 | 14 | | | | | | | | | |
| | | | 11 | | | | | | | | | | | | | | | | | |

| | | | | | | | | | | | | | | 34 | | | | |
|---|---|---|---|---|---|---|---|---|---|---|---|---|---|---|---|---|---|---|
| 35 | 64 | 82 | 106 | 110 | 110 | 90 | 84 | 81 | 81 | 81 | 81 | 82 | 82 | 91 | 96 | 97 | 91 | 71 |
| 36 | 64 | 94 | 131 | 169 | 144 | 103 | 85 | 82 | 81 | 81 | 81 | 81 | 84 | 84 | 96 | 99 | 138 | 128 | 75 |
| | | | 88 | 136 | 124 | | | | | | | | | | | 107 | 151 | 103 |
| | | | 116 | 94 | | | | | | | | | | | | 76 | 124 | 126 | 52 |
| | | | 38 | 102 | 110 | | | | | | | | | | | 73 | 82 | 50 |
| | | | 120 | 106 | 39 | | | | 60 | 50 | 20 | | | | | 31 | |
| | | 62 | 127 | 130 | | | | 89 | 117 | 95 | | | | | | | |
| | | 60 | 148 | 151 | 93 | | 76 | 120 | 163 | 180 | 111 | | | | | | |
| | | | 124 | 178 | 141 | 119 | 136 | 170 | 206 | 192 | 125 | | | | | | |
| | | | 117 | 150 | 124 | 99 | 112 | 133 | 179 | 184 | 116 | | | | | | |
| | | | 99 | 120 | | | | 112 | 139 | 93 | | | | | | | |
| | | | 112 | 123 | 60 | | | 58 | 77 | 54 | | | | | | | |
| | | 39 | 115 | 134 | 57 | | | | | | | | | | | | |
| | | | 120 | 108 | | | | | | | | | | | | | |
| | | | 96 | 148 | 134 | | | | | | | | | | | | |
| | 71 | 121 | 166 | 207 | 180 | 135 | 103 | 73 | | | | | | | | | |
| 21 | 60 | 121 | 158 | 199 | 196 | 197 | 169 | 157 | 122 | 86 | 46 | 19 | | | | | | |
| | 50 | 87 | 120 | 134 | 136 | 123 | 120 | 109 | 101 | 70 | 45 | | | | | | | |
| | | | 42 | | | | | | | | | | | | | | | |

CONNECTIVITY FUNCTION

FIRST STAGE OUTPUT

FIG. 4f

| | | 64 | | | | 90 | 84 | 81 | 81 | 81 | 81 | 82 | 82 | 91 | 96 | 97 | | | |
|---|---|---|---|---|---|---|---|---|---|---|---|---|---|---|---|---|---|---|---|
| | | | 94 | 131 | 169 | 144 | | | | | | | | | | | 138 | | |
| | | | | | 136 | 124 | | | | | | | | | | | | 151 | |
| | | | | | | 94 | | | | | | | | | | | | | |
| | | | | | | 110 | | | | | | | | | | | | | |
| | | | | | | 106 | | | | | | | | | | | | | |
| | | | | | | 130 | | | | | | | | | | | | | |
| | | | | | 148 | 151 | | | | 163 | 180 | | | | | | | | |
| | | | | | | 178 | 141 | 119 | 136 | 170 | 206 | 192 | | | | | | | |
| | | | | | | 150 | | | | 133 | 179 | 184 | | | | | | | |
| | | | | | | 120 | | | | | 139 | | | | | | | | |
| | | | | | | 123 | | | | | | | | | | | | | |
| | | | | | | 134 | | | | | | | | | | | | | |
| | | | | | | 108 | | | | | | | | | | | | | |
| | | | | | 148 | 134 | | | | | | | | | | | | | |
| | | | | 166 | 207 | 180 | 135 | | | | | | | | | | | | |
| | 60 | 121 | 158 | 199 | 196 | 197 | 169 | 157 | 122 | 86 | 46 | | | | | | | | |
| | | | | 134 | 136 | | | | | | | | | | | | | | |

CONNECTIVITY FUNCTION

SECOND STAGE OUTPUT

FIG. 4g

| | | | | | | | | | | | | | | | | | |
|---|---|---|---|---|---|---|---|---|---|---|---|---|---|---|---|---|---|
| | | 64 | | | | 90 | 84 | 81 | 81 | 81 | 81 | 82 | 82 | 91 | 96 | 97 | |
| | | | 94 | 131 | 169 | 144 | | | | | | | | | | | 138 |
| | | | | | | 124 | | | | | | | | | | | |
| | | | | | | 94 | | | | | | | | | | | |
| | | | | | | 110 | | | | | | | | | | | |
| | | | | | | 106 | | | | | | | | | | | |
| | | | | | | 130 | | | | | | | | | | | |
| | | | | | | 151 | | | | | | | | | | | |
| | | | | | | | 141 | 119 | 136 | 170 | 206 | | | | | | |
| | | | | | | 150 | | | | 179 | | | | | | | |
| | | | | | | 120 | | | | | | | | | | | |
| | | | | | | 123 | | | | | | | | | | | |
| | | | | | | 134 | | | | | | | | | | | |
| | | | | | | 108 | | | | | | | | | | | |
| | | | | | | 134 | | | | | | | | | | | |
| | | | | | 207 | 180 | 135 | | | | | | | | | | |
| | 60 | 121 | 158 | 199 | 196 | 197 | | 157 | 122 | 86 | 46 | | | | | | |
| | | | | | | | | | | | | | | | | | |

CONNECTIVITY FUNCTION

THIRD STAGE OUTPUT

FIG. 5a
CONNECTIVITY CONDITIONS
OPERATING ZONE
FUNCTION
CONDITIONS WHEN FUNCTION IS PRESENT (X=1)
(PRIME AND ARROW INDICATE CONNECTIVITY DECISION OF PRESENT ITERATION)
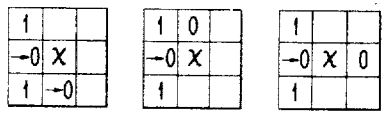
$AC\overline{B'(D'GE)}$
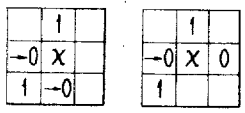
$AE\overline{B'(D'G)}$
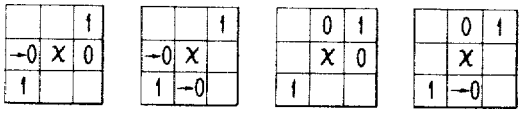
$AH\overline{(B'E+D'G)}$
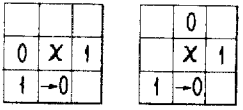
$AG\overline{D'(B'E)}$
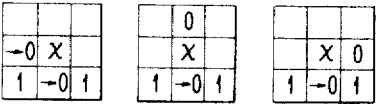
$AF\overline{D'(B'EG)}$
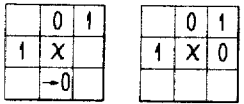
$BH\overline{E(D'G)}$
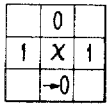
$BG\overline{(D'+E)}$
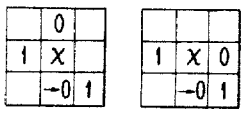
$BF\overline{D'(EG)}$
| FIG. 5a |
|---|
| FIG. 5b |
FIG. 5

FIG. 5b
CONNECTIVITY CONDITIONS

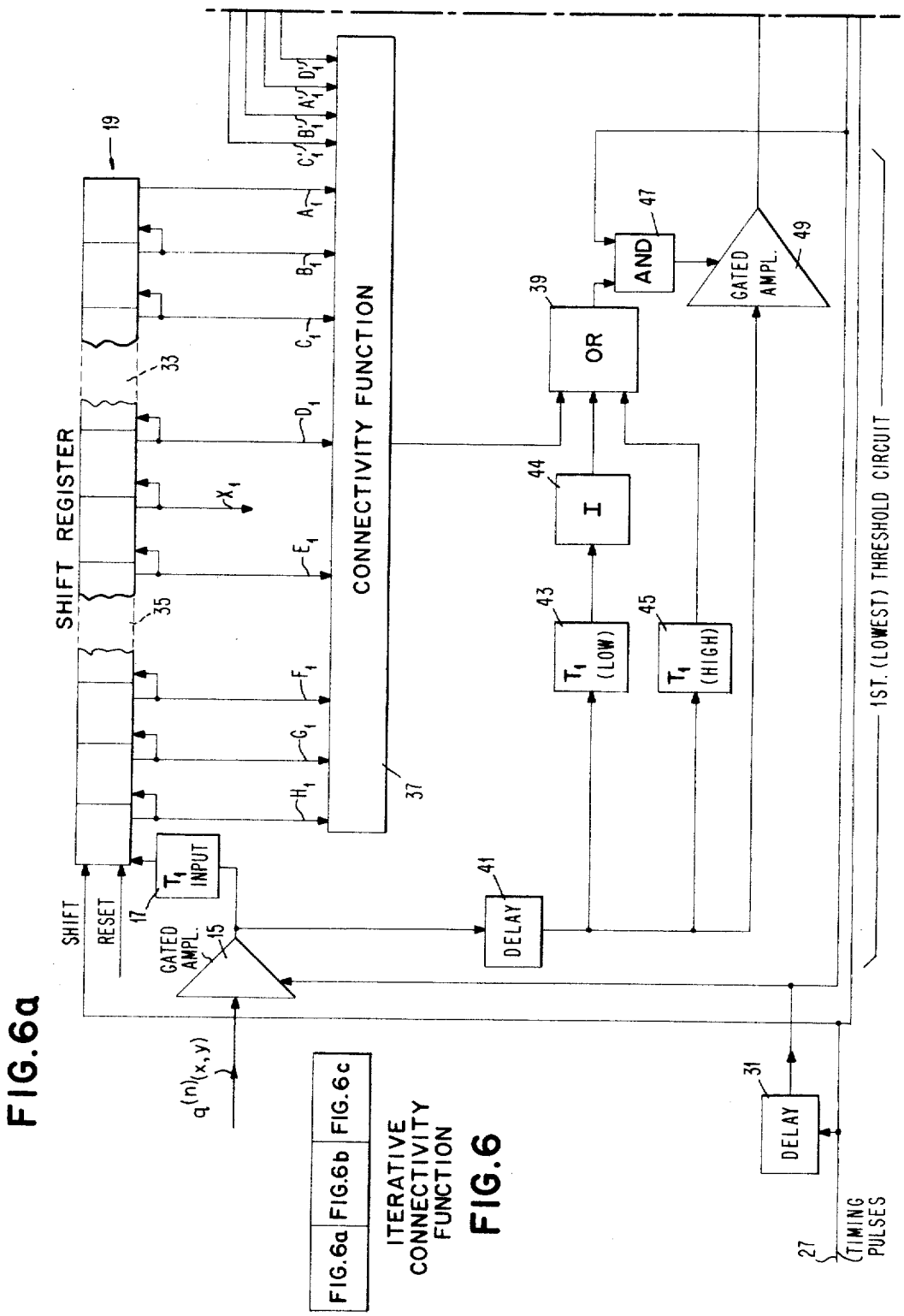

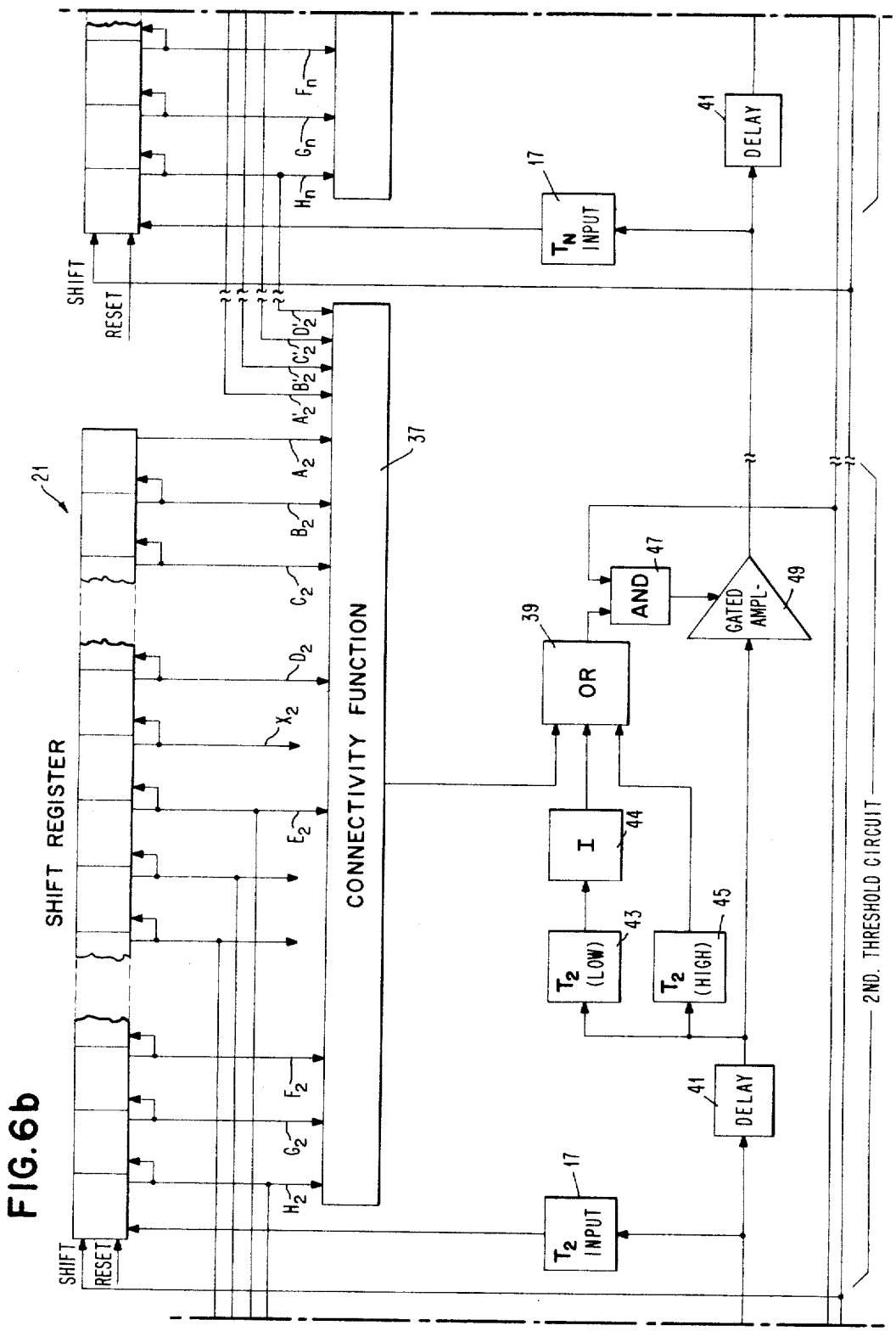

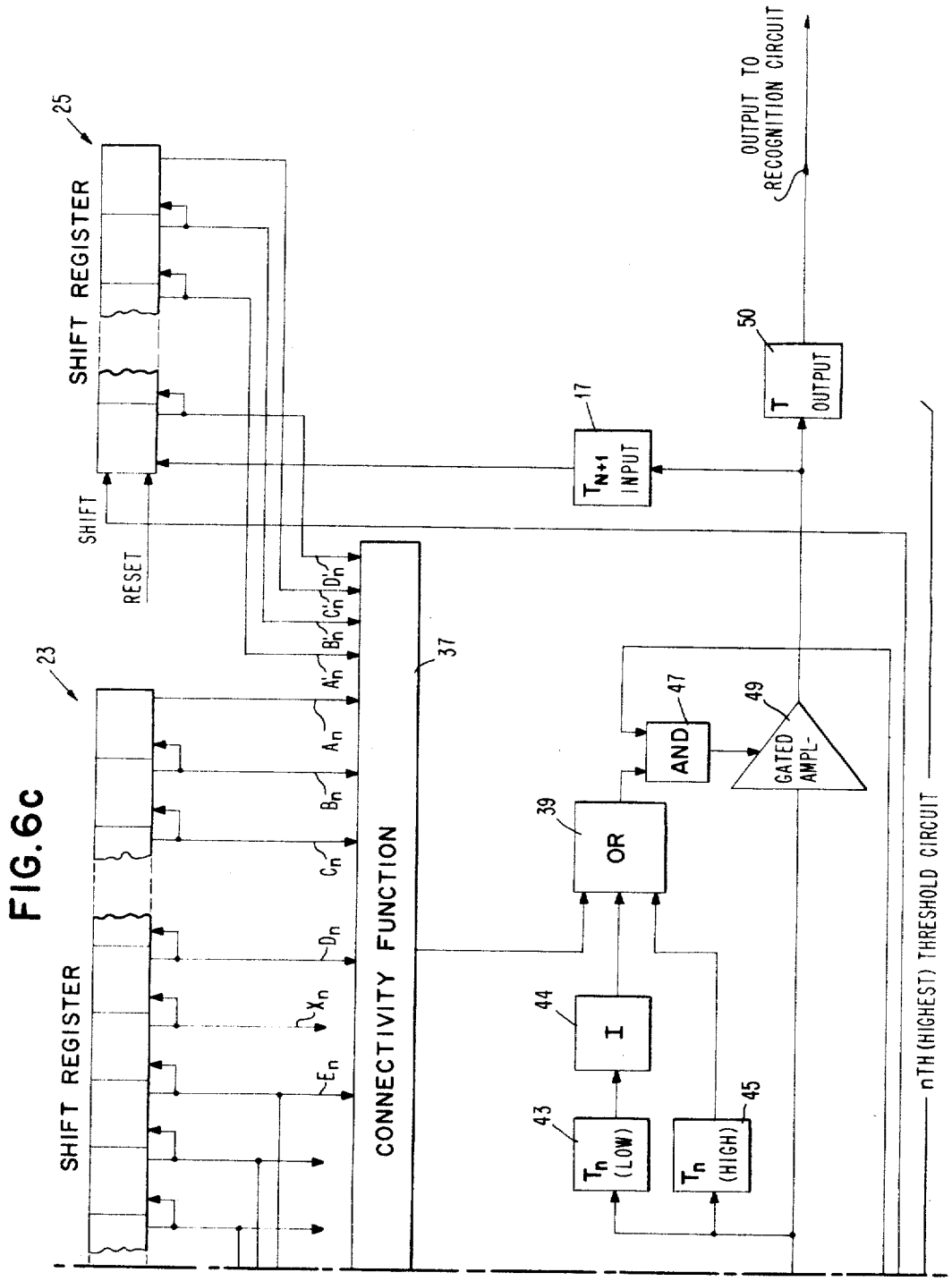

CONNECTIVITY FUNCTION

THRESHOLD CIRCUIT

SHIFT REGISTER

BIASED MAJORITY CIRCUIT

United States Patent Office 3,339,179
Patented Aug. 29, 1967

3,339,179
PATTERN RECOGNITION PREPROCESSING
TECHNIQUES
Glenmore L. Shelton, Jr., Carmel, N.Y., and Lawrence P. Horwitz, Versoix, Switzerland, assignors to International Business Machines Corporation, New York, N.Y., a corporation of New York
Continuation of application Ser. No. 202,452, June 14, 1962. This application Feb. 23, 1966, Ser. No. 538,504
2 Claims. (Cl. 340—146.3)

This invention relates to preprocessing techniques for pattern recognition systems and, in particular, to technique for analyzing a two-dimensional, binary pattern for the presence of features including the location of the center line within a thick line, line intersections, slopes and end points, line curvature, and other features.

This application is a continuation of co-pending application, Ser. No. 202,452, which was filed on June 14, 1962.

Some pattern recognition systems base recognition on the presence or absence of features such as: lines of various shapes, intersections, end points, shapes of areas, etc. Other systems provide identification based on mask matching or cross-correlating techniques using the entire pattern. Some systems operate directly on the pattern to be identified and others include some form of preprocessing such as: automatic clipping level control to compensate for intensity variations; generation of secondary functions, such as autocorrelation functions, Fourier transforms, etc.; compensation for misregistration; etc. The preprocessing techniques in the present invention are useful in many of these identification systems because they provide a pattern which is identical in shape to the input binary pattern to be identified, but having values with a ridge that is approximately centered within each line. This pattern also contains indications of intersection points, end points, line curvature, line slopes, etc.

The pattern is obtained by iteratively operating on the pattern to be identified with a matrix labelled the "incidence" matrix. The result of operating on a wide-line input pattern by the incidence matrix is to generate an output pattern having a "ridge" of relatively high values along the center of each wide line and lower values on either side of the ridge. Intersection points and end points are also determinable by the relative amplitudes of the values along the ridges. The operation of the incidence matrix and the configuration of the resulting pattern will be described in detail below in conjunction with a system for generating the pattern and selecting features from the pattern for use by a recognition system.

An object of the present invention is to provide indications of the presence of features in a pattern.

A further object is to provide indications of the presence of features such as various-shaped lines, intersections, line slopes, and end points in a pattern.

Another object is to generate a thin-line pattern from a wide-line pattern.

A further object is to operate on an input pattern with an incidence matrix to provide indications of the presence of features such as various-shaped lines, intersections, and end points.

A still further object is to iteratively operate on an input pattern with an incidence matrix to generate an output pattern having indications of the presence of features such as various-shaped lines, intersections, and end points.

In accordance with the invention, an input pattern $f(x,y)$ is iteratively operated on by an incidence matrix $p(x,y)$ to generate an nth-order output pattern $q_n(x,y)$.

If the pattern to be identified is considered to be a matrix of discrete areas having coordinates $(x,y)$ that are predominately black or predominately white, depending upon the positions of the lines that the specimen comprises, there is a binary function $f(x,y)$ that is "1" for each instance where the area at the coordinates $(x,y)$ is black and "0" where white. This pattern $f(x,y)$ is operated on by the incidence matrix $p(x,y)$ to generate the first order output pattern $q^{(1)}(x,y)$ as follows:

$$q^{(1)}(x,y) = f(x,y) \sum_{x_1,y_1} f(x+x_1, y+y_1) p(x_1,y_1) \quad (1)$$

The expression $f(x+x_1, y+y_1)$ is intended to represent, in a general sense, a pattern of coordinate points surrounding the point $x,y$. The subscript 1 (i.e., $x_1$ and $y_1$) means that the surrounding coordinate points are located one coordinate unit from the point $x,y$.

Among the many incidence matrices which provide excellent results is the basic matrix:

$$p(x,y) = \begin{bmatrix} 0 & 1 & 0 \\ 1 & 0 & 1 \\ 0 & 1 & 0 \end{bmatrix} \quad (2)$$

Using this incidence matrix (2) in the Formula 1 for $q^{(1)}(x,y)$ results in:

$$q^{(1)}(x,y) = f(x,y)[f(x-1,y) + f(x+1,y) + (x,y+1) + f(x,y-1)] \quad (3)$$

The incidence matrix shown in Equation 2 controls the design of a circuit (to be later described) such that the function $q^{(1)}(x,y,)$ is generated according to Equations 1 or 3. This function has values that are equal to the sum of the points that are left $(x-1,y)$, below $(x,y-1)$, above $(x,y+1)$ and right $(x+1,y)$ of each point $(x,y)$ in the input function, when the point $(x,y)$ is "1" and they are equal to 0 when the point $(x,y)$ is "0."

Since $q$ is a function of the binary pattern $f(x,y)$, the non-zero (black) portion of the binary pattern is replaced by a multivalued pattern, and the zero (white) data in the input pattern remains zero. That is, the operation of the incidence function does not spread the non-zero portion of the input pattern into the zero data areas as is caused by many preprocessing functions.

The "operation" of the incidence matrix can be summarized by saying that a matrix $p(x,y)$ is centered on a point $(x,y)$ of a binary pattern. If the point has a non-zero value, a summation is taken between the surrounding bits of the matrix and the associated points of the pattern on which they lie. This "operation" is repeated for each point in the pattern and each nonzero point in the pattern is then given a new value equal to the value of the summation which took place for such point. Thus a new pattern is produced which is composed of points which have the values of the performed summations.

The second order output pattern $q^{(2)}(x,y)$ is generated by operating on the first order output pattern $q^{(1)}(x,y)$ in a similar manner as follows:

$$q^{(2)}(x,y) = f(x,y) \sum_{x_1,y_1} q^{(1)}(x+x_1, y+y_1) p(x_1,y_1) \quad (4)$$

The function (4) may be rewritten without dependence upon $q^{(1)}(x,y)$ as follows:

$$q^{(2)}(x,y) = f(x,y) \sum_{x_1x_2, y_1y_2} [f(x+x_1, y+y_1) \cdot f(x+x_1, y+y_1+y_2) \cdot p(x_1,y_1) y(x_2,y_2)] \quad (5)$$

which may be further expanded for the particular $p$ matrix (2) to provide:

$$q^{(2)}(x,y) = f(x,y) \begin{Bmatrix} f(x-1,y) \\ +f(x,y+1) \\ +f(x+1,y) \\ +f(x,y-1) \end{Bmatrix} \begin{bmatrix} f(x-2,y)+f(x,y)+f(x-1,y+1)+f(x-1,y-1) \\ f(x-1,y+1)+f(x+1,y+1)+f(x,y+2)+f(x,y) \\ f(x,y)+f(x+1,y+1)+f(x+2,y)+f(x+1,y-1) \\ f(x,y)+f(x-1,y-1)+f(x,y-2)+f(x+1,y-1) \end{bmatrix} \quad (6)$$

Similarly, the $n$-order output function $q^{(n)}(x,y)$ is described as:

$$q^{(n)}(x,y) = f(x,y) \sum_{x_1,y_1} q^{(n-1)}(x+x_1, y+y_1) p(x_1,y_1) \quad (7)$$

which can be rewritten as:

$$q^{(n)}(x,y) = f(x,y) \sum_{\substack{x_1,x_2,\ldots,x_n \\ y_1,y_2,\ldots,y_n}} f(x+x_1, y+y_1) \cdot f(x+x_1+x_2, y+y_1+y_2) \ldots f(x+x_1+x_2+\ldots+x_n, y+y_1+y_2\ldots+y_n) \cdot p(x_1,y_1) \cdot p(x_2,y_2) \cdot \ldots p(x_n,y_n) \quad (8)$$

The derivations of each $q(x,y)$ of Formulas 4, 5, 6, 7, 8, can be summarized as follows. The resultant pattern produced by the first summation and consisting of a pattern of points which are summation results is operated on by the incident matrix $p(x,y)$ in the same way as the original pattern. The matrix $p(x,y)$ is centered on each point of the second pattern and a summation between the surrounding points of the matrix and the surrounding points of the nonzero points of the second pattern are summed and the resultant summation is placed in the position of such point. This is an iterative technique. As in the case of the first pattern, each summation for each point is performed only if the point does not have a zero value.

The effect of such summations is that nonzero points which are surrounded by other nonzero points will produce a resultant point having a relatively high summation value, whereas nonzero end points of the pattern and the like which are not surrounded by other nonzero points in the pattern will have relatively low values of summation.

The data elements in the output pattern $q^{(n)}$ generated in accordance with the preceding formulas are representative of the number of different connected paths that begin at each point on the input pattern where each path is permitted to traverse only non-zero input data elements (i.e., each path must have all of its points within the black area of the input pattern). Thus, $q^{(n)}(x,y) = r$ indicates that there are $r$ paths of length $n$ that begin at point $(x,y)$ of the input pattern. For example, if $q^{(3)}(3,2) = 13$, then there are thirteen paths of length 3 that begin at point (3,2) on the input pattern. The following example input configuration $f(x,y)$ falls within this example:

$$f(x,y) = \begin{array}{c|ccccc} 4 & & & & & * \\ 3 & & & & & * \\ 2 & & & * & * & * \\ y \uparrow \quad 1 & & & * & * & * \\ \hline & 1 & 2 & 3 & 4 & 5 \end{array}$$
$$x \rightarrow \quad (9)$$

In this configuration, there are two 1-step paths, five 2-step paths and thirteen 3-step paths beginning at the point (3,2) that remain within the non-zero (*) pattern areas. The 1-step paths are obviously:

$$(3,2) \rightarrow (3,1) \quad (10)$$
$$(3,2) \rightarrow (4,2)$$

The 2-step paths are:

$$(3,2) \rightarrow (3,1) \rightarrow (3,2) \quad (11)$$
$$(3,2) \rightarrow (3,1) \rightarrow (4,1)$$
$$(3,2) \rightarrow (4,2) \rightarrow (3,2)$$
$$(3,2) \rightarrow (4,2) \rightarrow (4,1)$$
$$(3,2) \rightarrow (4,2) \rightarrow (5,2)$$

The 3-step paths are:

$$(3,2) \rightarrow (3,1) \rightarrow (3,2) \rightarrow (3,1) \quad (12)$$
$$(3,2) \rightarrow (3,1) \rightarrow (3,2) \rightarrow (4,2)$$
$$(3,2) \rightarrow (4,2) \rightarrow (3,2) \rightarrow (4,2)$$
$$(3,2) \rightarrow (4,2) \rightarrow (3,2) \rightarrow (3,1)$$
$$(3,2) \rightarrow (3,1) \rightarrow (4,1) \rightarrow (4,2)$$
$$(3,2) \rightarrow (4,2) \rightarrow (4,1) \rightarrow (3,1)$$
$$(3,2) \rightarrow (4,2) \rightarrow (5,2) \rightarrow (5,1)$$
$$(3,2) \rightarrow (4,2) \rightarrow (4,1) \rightarrow (5,1)$$
$$(3,2) \rightarrow (3,1) \rightarrow (4,1) \rightarrow (5,1)$$
$$(3,2) \rightarrow (4,2) \rightarrow (5,2) \rightarrow (5,3)$$
$$(3,2) \rightarrow (4,2) \rightarrow (5,2) \rightarrow (4,2)$$
$$(3,2) \rightarrow (4,2) \rightarrow (4,1) \rightarrow (4,2)$$
$$(3,2) \rightarrow (3,1) \rightarrow (4,1) \rightarrow (3,1)$$

These results can be derived from the preceding formulas in the following manner. The 1-step paths that are present in the configuration (9) are obtained using Formulas 1 and 2 which provide the following $q^{(1)}(x,y)$ pattern:

$$q^{(1)}(x,y) = \begin{array}{c|ccccc} 4 & 0 & 0 & 0 & 0 & 1 \\ 3 & 0 & 0 & 0 & 0 & 2 \\ 2 & 0 & 0 & 2 & 3 & 3 \\ y \uparrow \quad 1 & 0 & 0 & 2 & 3 & 3 \\ \hline & 1 & 2 & 3 & 4 & 5 \end{array}$$
$$x \rightarrow \quad (13)$$

Thus, these are two 1-step paths starting at point (3,2) as listed at (10) above. The 2-step paths that are present in the configuration (9) are obtained using Formulas 2 and 4, where Formula 4 indicates the same type of operation on the function $q^{(1)}(1)$ and (13) that performed on the input function $f(x,y)$ to obtain $q^{(1)}$, and results in:

$$q^{(2)}(x,y) = \begin{array}{c|ccccc} 4 & 0 & 0 & 0 & 0 & 2 \\ 3 & 0 & 0 & 0 & 0 & 4 \\ 2 & 0 & 0 & 5 & 8 & 7 \\ y \uparrow \quad 1 & 0 & 0 & 5 & 7 & 6 \\ \hline & 1 & 2 & 3 & 4 & 5 \end{array}$$
$$x \rightarrow \quad (14)$$

Thus, there are five 2-step paths starting at point (3, 2), as listed above at (11). The 3-step paths that are present in the configuration (9) are similarly obtained, using the general Formula 7 where $n=3$. This formula prescribes a similar operation on $q^{(n-1)}$ (which is $q^{(2)}$ in this case) and results in:

$$q^{(3)}(x,y) = \begin{array}{c|ccccc} 4 & 0 & 0 & 0 & 0 & 4 \\ 3 & 0 & 0 & 0 & 0 & 9 \\ 2 & 0 & 0 & 13 & 19 & 18 \\ y \uparrow \quad 1 & 0 & 0 & 12 & 19 & 14 \\ \hline & 1 & 2 & 3 & 4 & 5 \end{array}$$
$$x \rightarrow \quad (15)$$

Thus, there are thirteen 3-step paths starting at point (3, 2) as listed above at (12).

In proceeding from diagram (9) through diagram (15) of the specification it must be remembered that the $3 \times 3$ incident matrix of diagram (2) is centered in sequence on each point of the $4 \times 5$ matrix and a summation is made for each nonzero point of the $4 \times 5$ matrix. Thus the center point of the matrix of diagram (2) is placed in sequence over each of the twenty points of the $4 \times 5$ matrix and a summation of the surrounding points is taken for those points of the $4 \times 5$ matrix which have nonzero values and each of such points is substituted for by the value of the summation to produce a second pattern (or matrix) composed of summation values.

The 3×3 matrix is then centered in each of the points of the new pattern (matrix) and further summations are performed to produce a third summation matrix, and so on.

The above example clearly illustrates the iterative operation on $f(x,y)$ with the operator $p(x,y)$ and shows that the $q$ functions thus generated are indicative of the number of paths emanating from every point on the input pattern and contained within the pattern. The $q$ functions contain values that are the smallest near the edges and corners of the input pattern and are higher toward the center of the pattern. A considerably larger input pattern that clearly illustrates this latter feature will be shown and described with respect to the detailed embodiment of the invention. The $q$ functions thus obtained are similar in shape to the binary input pattern that is presented to the preprocessing systems. Each non-zero (binary "1") data element of the input pattern is replaced by a non-zero digital data element in the output pattern. The output pattern data is multi-valued with the highest values corresponding to the areas of the input pattern where lines intersect or where lines contain relatively large changes in slope. The output pattern also contains relatively high values at the locations that correspond to the center line or mean line of wide-line input patterns. This latter characteristic forms the basis of the embodiment to be described in detail. In this embodiment, an input pattern comprised of line segments of varying widths is converted into a thin-line output pattern that is suitable for use in a recognition system.

Other incidence matrices could be employed to produce output patterns with enhanced characteristics. The primary requirement is that the incidence matrix be gated by the pattern under operation. That is, the incidence matrix is gated by the input function $f(x,y)$ in the generation of $q^{(1)}(x,y)$; by $q^{(1)}(x,y)$ in the generation of $q^{(2)}(x,y)$; etc. This insures that the input specimen is not "spread" by the operation of the incidence matrix but, rather, retains its original outline shape.

The foregoing and other objects, features and advantages of the invention will be apparent from the following more particular description of a preferred embodiment of the invention, as illustrated in the drawings.

In the drawings:

FIGURE 2 is a diagram showing a typical wide-line input specimen.

FIGURE 3 is a diagram showing the result of the operation of the invention in the typical input specimen shown in FIGURE 2.

FIGURES 4a through 4g are a series of diagrams showing the effect of various stages of the operation of the invention in the typical input specimen shown in FIGURE 2.

FIGURE 5 shows the arrangement of FIGURES 5a and 5b to form a composite figure.

Figure 5B:
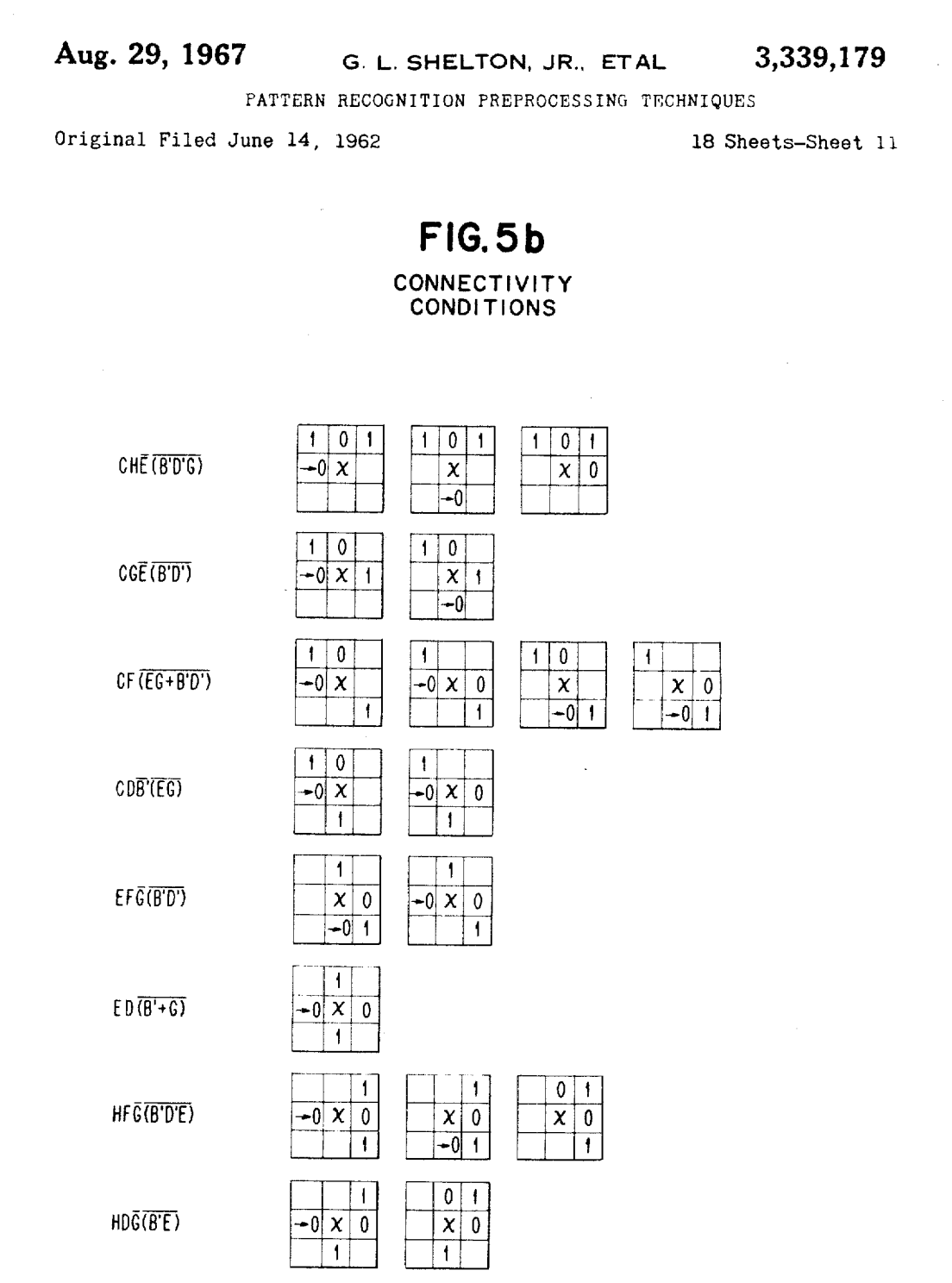

FIGURES 5a and 5b together form diagrams showing the connectivity function, mathematically and geometrically.

FIGURE 6 shows the arrangement of FIGURES 6a, 6b and 6c to form a composite figure.

Figure 1:
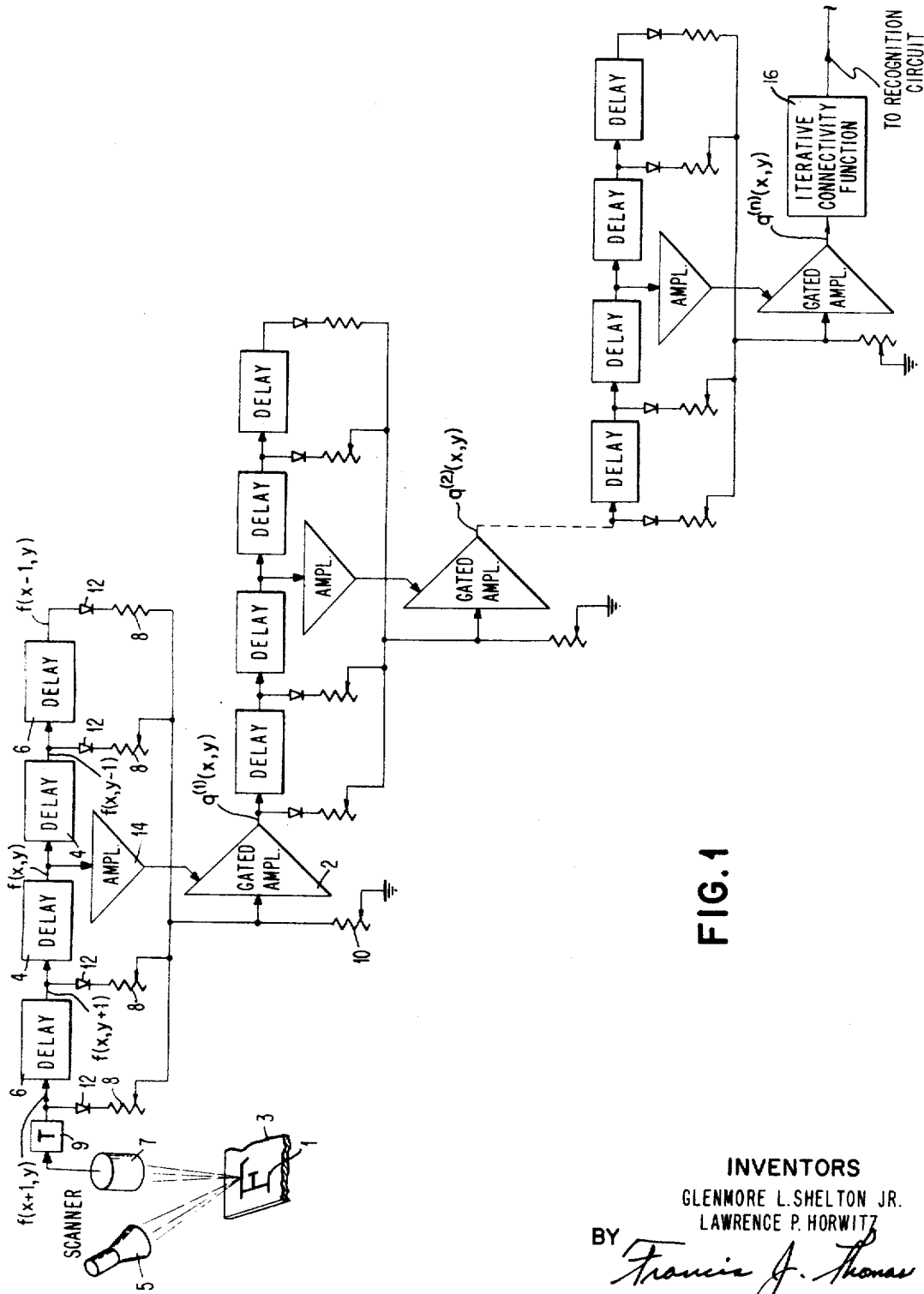
FIGURE 1 is a functional diagram of a preferred embodiment of the invention.

FIGURES 6a, 6b and 6c taken together form functional diagrams of the preferred embodiment of the iterative connectivity function that is shown in block-diagram form in FIGURE 1.

Figure 7A:
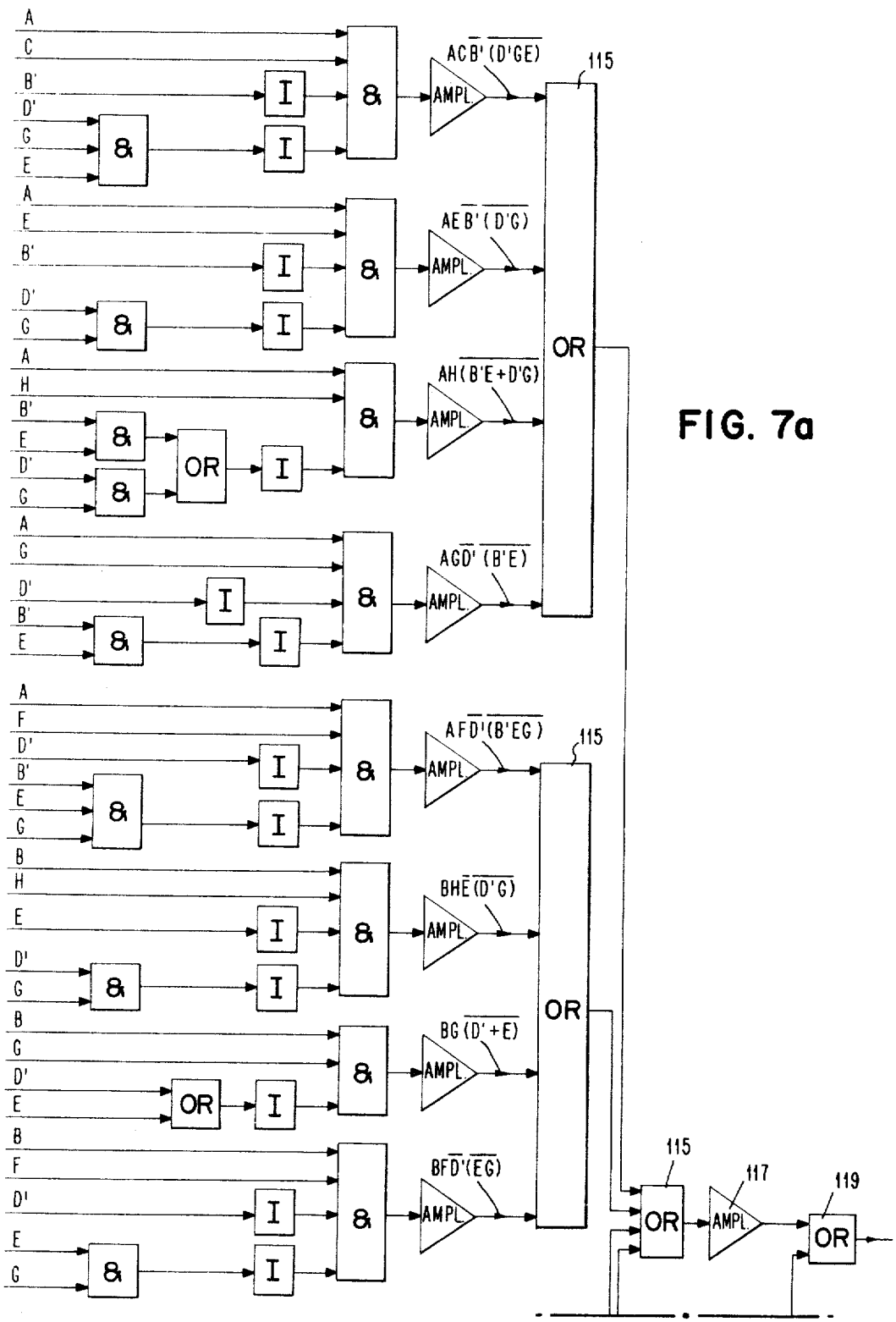
Figures 7, 7B:
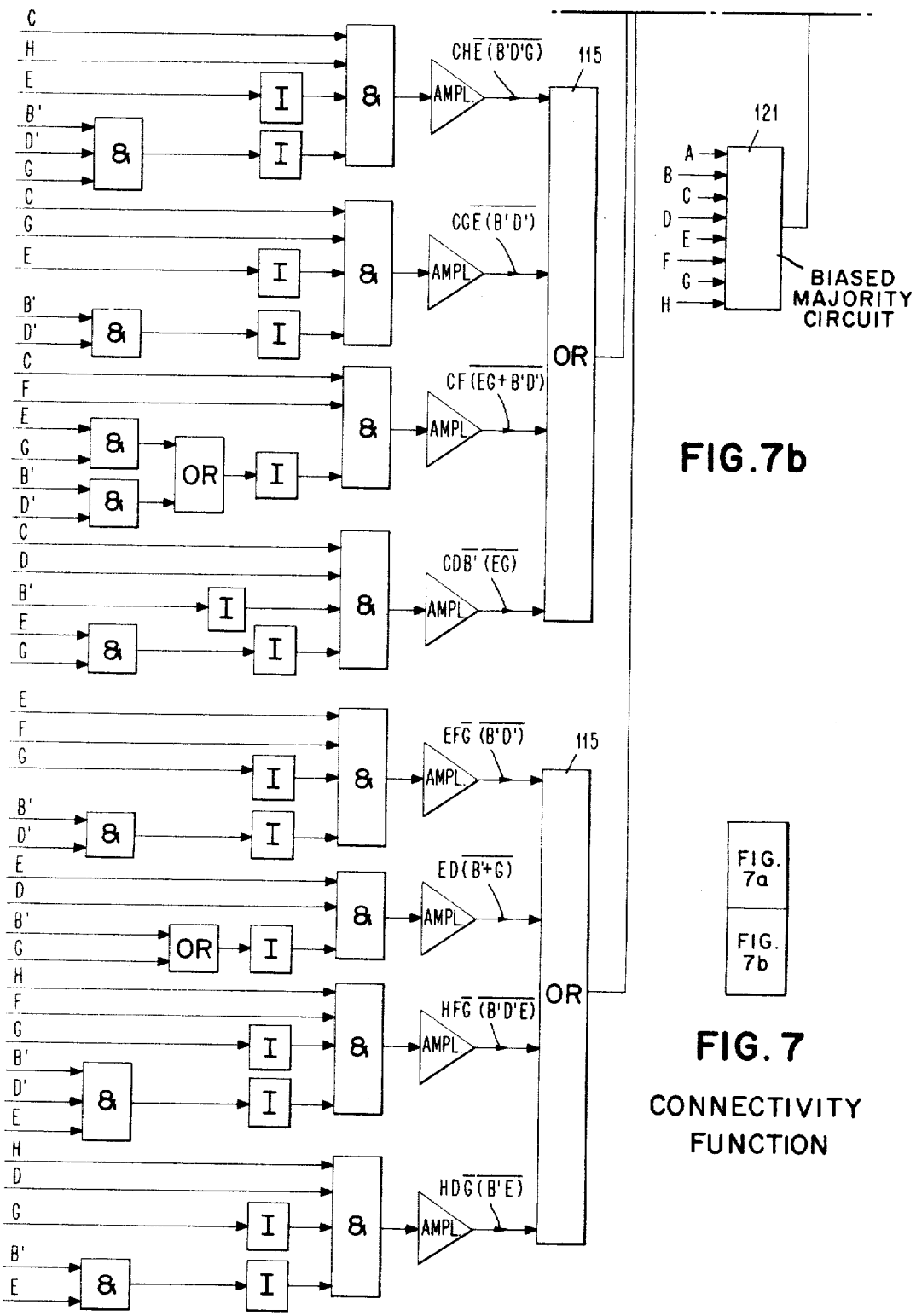

FIGURE 7 shows the arrangement of FIGURES 7a and 7b to form a composite figure.

FIGURES 7a and 7b taken together form functional diagrams of the connectivity function circuit that is shown in block-diagram form in FIGURES 6a, 6b and 6c.

Figure 8:
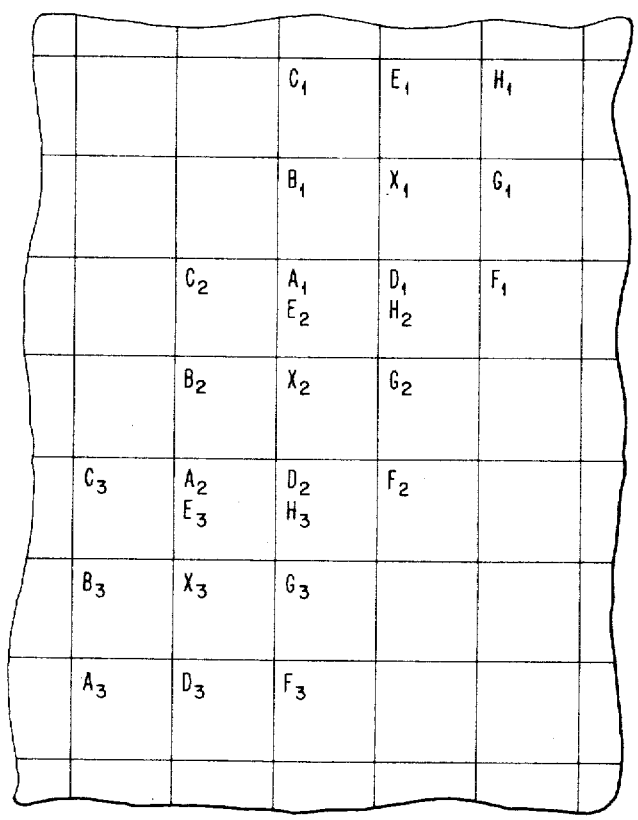

FIGURE 8 is a diagram illustrating the outputs of the shift registers shown in FIGURES 6a, 6b and 6c.

Figure 9:
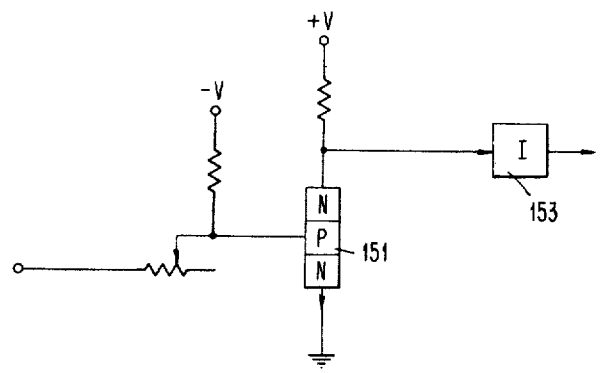

FIGURE 9 is a detailed diagram of the threshold circuit that is shown in block diagram form in FIGURES 6a, 6b and 6c.

Figure 10:
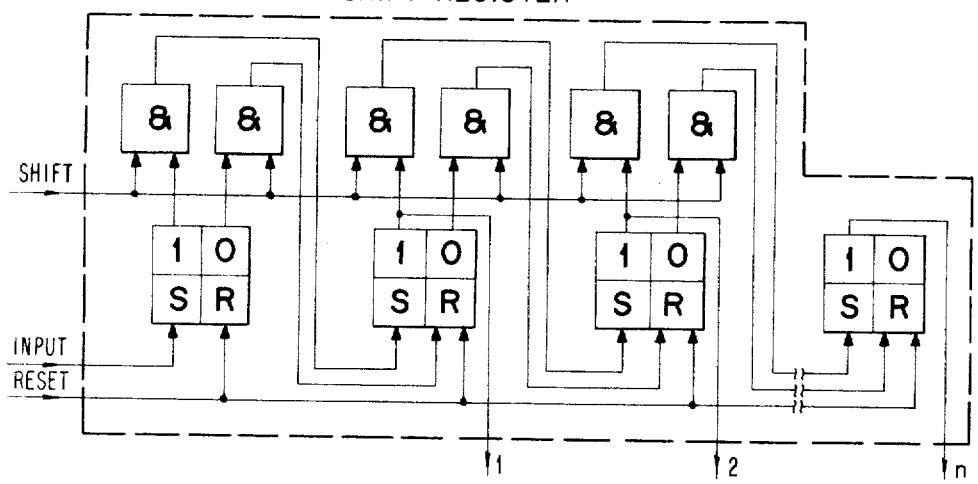

FIGURE 10 is a detailed diagram of the shift register that is shown in block-diagram form in FIGURES 6a, 6b and 6c.

Figure 11:
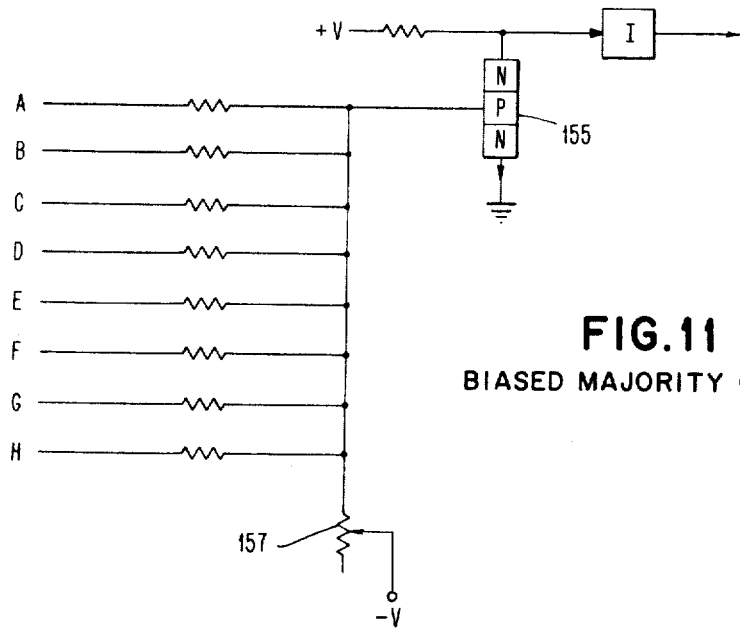

FIGURE 11 is a detailed diagram of the biased majority circuit that is shown in block diagram form in FIGURE 7b.

A preferred embodiment of the invention is illustrated in the functional diagram of FIGURE 1. The specimen 1 to be identified is shown, by way of example, to be the upper case alphabetic character "F" and is located on a document 3. The document and specimen are scanned in a conventional manner by a flying spot (cathode ray tube) scanner 5 and a light-sensitive device 7, such as a photomultiplier or photocell. The scanner output (from the light-sensitive device 7) is a time-varying analog output signal indicative of the intensity of light reflected by the document as the light beam (or raster) from the cathode ray tube is directed over the document area. This signal is thresholded in a circuit 9 to provide binary signals indicative of the scanned specimen, where a "1" signal corresponds to the presence of a portion of the specimen and a "0" signal corresponds to the surrounding document area. A typical threshold circuit that is suitable for use in this application is shown in detail in FIGURE 9.

The first order "$q$ function," namely $q^{(1)}(x,y)$ is generated from the input function $f(x,y)$ at the output of a gated amplifier 2. This function is generated according to Equations 1, 2 and 3 in the following manner. The scanner produces a time-varying output signal as the scanning beam traverses the document, column by column. Although this time-varying signal is generated as a function of time, it may be considered to be a function of the coordinates $(x,y)$ because, at any given time, the scanner output corresponds to a unique point $(x,y)$ on the document. If, at the beginning of the scan, the beam is directed toward the lower left corner of the specimen, and then scans the specimen with a series of vertical (upward) lines from left to right across the specimen, then the scanner output function may be considered to originally correspond to the point $(0,0)$ followed by $(0,1)$, $(0,2)$, . . . during the first vertical line, and to represent the points $(1,0)$, $(1,1)$, $(1,2)$, . . . during the second vertical line, etc.

The incidence matrix shown in Equation 2 controls the design of the circuit such that the function $q^{(1)}(x,y)$ is generated according to Equations 1 or 3. This function has values that are equal to the sum of the points that are left $(x-1,y)$, below $(x,y-1)$, above $(x,y+1)$ and right $(x+1,y)$ of each point $(x,y)$ in the input function, when the point $(x,y)$ is "1," and that are equal to 0 when the point $(x,y)$ is "0."

In FIGURE 1, delay circuits 4 and 6 are arranged to generate the point $(x,y)$ and the surrounding points $(x-1,y)$, $(x,y-1)$, $(x,y+1)$ and $(x+1,y)$, as indicated in the diagrams. The time-varying signal that is produced as the scanning beam traverses the document is applied to the delay circuits and, if the scanning beam covers the document with a group of adjacent vertical lines (bottom to top, from left to right), the delay lines contain the specimen data as a string of columns, laid from end to end. Thus, the point $(x,y)$ is scanned immediately after the point $(x,y-1)$ is scanned, and the point $(x,y+1)$ is scanned immediately after the point $(x,y)$ is scanned. For this reason, delay circuits 4 provide delays equivalents to the time taken to scan adjacent points along one line of the scan. Since the points $(x-1,y)$ and $(x+1,y)$ are scanned before and after point $(x,y)$ by an amount of time equal to one scan line (because they occur at the same vertical position, but on successive scan lines), delay circuits 6 provide delays such that the total delay of a delay circuit 6 plus a delay circuit 4 equals the duration of a scan line. In this manner, point $(x-1,y)$ is scanned first followed by point $(x,y-1)$, point $(x,y)$, point $(x,y+1)$ and point $(x+1,y)$ and the data corresponding to all five points is simultaneously generated on the leads connecting the delay circuits, as indicated in FIGURE 1. The delay line function could obviously be performed by shift registers, if desired.

The data corresponding to the four points surrounding the point $(x,y)$ are summed in a resistor network comprising resistors 8 and resistor 10 and the total is applied to the gated amplifier 2. This amplifier is conditioned by the signal corresponding to the point $(x,y)$ when this signal is "1" [indicating that the point $(x,y)$ is within the specimen] and the amplifier is blocked when the signal is "0." Thus, the sum of the points surrounding the point $(x,y)$ is passed by the gated amplifier when the input $(x,y)$ is "1." This gated sum corresponds to $q^{(1)}(x,y)$ according to Formulas 1 and 3, as shown in FIGURE 4a.

In order to compensate for signal attenuation in the delay circuits 4 and 6, all but one of the series resistors 8 is variable and adjusted to provide equal signals to the summing resistor 10 when equal signals are generated by the scanner for the points surrounding the point $(x,y)$. The adjustment may be made while scaning a totally black document ("1" values throughout) such that equal currents flow through each resistor 8. A group of diodes 12 are used to prevent interaction between the signals applied to the resistor network. An amplifier 14 guarantees that a sufficiently strong signal is present to gate the amplifier 2.

The multi-valued function $q^{(1)}(x,y)$, that is, the analog output of amplifier 2, is applied to a second function generator which operates in a similar manner to generate an analog signal $q^{(2)}(x,y)$ (which is represented by FIGURE 4b). In a like manner, the higher-order $q$ functions are each generated by operating on the next-lower order q functions, where examples of $q^{(3)}(x,y)$ and $q^{(4)}(x,y)$ are shown in FIGURES 4c and 4d. The resulting function $q^{(n)}(x,y)$ represents a two-dimensional pattern having a ridge of high values along the center of each line and high values at points where lines intersect, sharply curve, or connect. This function has been shown to also be indicative of the number of $n$-step paths that begin at point $(x,y)$ on the input specimen and that are contained within the specimen. The scanner output signal was shown to be thresholded by a circuit 9 in FIGURE 1. This circuit may be eliminated and the scanner signal applied directly to delay circuit 6. The analog signal from the scanner, representing the specimen intensity distribution, is then iteratively operated on by the incidence matrix to form q functions that are quite similar to the functions produced when the threshold circuit 9 is used. In this case, the gated amplifier 2 would be conditioned only when the specimen intensity exceeded a predetermined value, depending upon the circuit constants.

In the preferred embodiment of the invention, the resulting function $q^{(n)}(x,y)$ is applied to an iterative connectivity function circuit 16 which provides an indication of a thin-line pattern corresponding to the center of the lines within the input specimen. The output of the iterative connectivity function circuit 16 is applied to a recognition circuit (not shown) which indicates the identity of the specimen. In this preferred embodiment the function $q^{(n)}(x,y)$ is used merely to indicate the center of the lines in the specimen and recognition is based on this thin-line pattern. Obviously, if desired, the data indicative of the intersections and curvature (shape) of the specimen lines could be interrogated and used for recognition purposes.

FIGURE 2 shows a binary (thresholded) version of the scanner output for a typical specimen "F." It should be noted that this typical specimen has lines of inconsistent width. If the scanner sensitivity were decreased, (the scanner output thresholded at a higher value) and the points having lower intensities would be disregarded, and the specimen would be seriously distorted. In this case, the wide lines in the specimen would be thinned, but portions of the specimen would be deleted. In accordance with the preferred embodiment of the invention, the data shown in FIGURE 2 is converted to the pattern shown in FIGURE 3, which is made up of a continuous thin line that essentially follows the center of the input specimen lines.

The thin-line, continuous pattern shown in FIGURE 3 is generated by operating on the input specimen pattern (FIGURE 2) to generate a sequence of "$q$" functions, and the highest-order "$q$" function is then operated on by the iterative connectivity function 16. This sequence of operation is shown in FIGURES 4a through 4g, where FIGURES 4a, b, c and d show the functions $q^{(1)}(x,y)$, $q^{(2)}(x,y)$, $q^{(3)}(x,y)$ and $q^{(4)}(x,y)$. This last function is then operated on by applying a three stage connectivity function to produce the sequence of diagrams in FIGURES 4e, f and g. The first stage of the iteration provides a pattern (FIGURE 4e) which retains only those points from FIGURE 4d having values below "90" that are needed to preserve line continuity. Similarly, the second stage of the iteration (FIGURE 4f) removes those unnecessary points with values below "130," and the third stage (FIGURE 4g) deletes unnecessary points with values of "130" or higher. Hence, the process not only provides a thin-line pattern, but insures that the resulting pattern follows the high-valued regions of the function $q^{(n)}(x,y)$ corresponding to the center lines of the input specimen (FIGURE 2). The (analog) system output (FIGURE 3) is obtained by replacing each non-zero point in FIGURE 4g with a heavy dot.

Of the many connectivity functions which could be utilized, the function shown in FIGURE 5 has been found to be especially useful, and the patterns shown in FIGURES 3, 4f and 4g were derived using this function, with a minor modification to be described later. The connectivity function shown in FIGURE 5 operates on a three unit square "operating zone" (FIGURE 5a), where the center point $(x)$ is the area under consideration, and the surrounding points (A, B, C, D, E, F, G and H) together with the center point, determine whether the center point is necessary to preserve the continuity of a line. FIGURE 5 shows the connectivity conditions that fulfill the following concept:

(1) A point is connecting if there is no available alternate path which would preserve continuity (connectivity) between two or more surrounding points.

(2) Continuity is considered to be preserved if a horizontal, vertical or diagonal path is present, or if a combination of these paths is present.

This concept is merely one of a large family of connectivity concepts. Another useful concept retains points necessary for horizontal or vertical connectivity and does not rely on diagonal paths.

The three unit square operating zone is scanned through each column of the function ($q^{(4)}(x,y)$ shown in FIGURE 4d, from bottom to top, starting with the left side of the pattern. Thus, operating zone areas A, B, C and D were "$x$" areas at some previous time in the present stage of the iteration because they are to the left of or below the "$x$" area. In order to properly determine whether any given point $x$ is a connecting point it is necessary to consider, not only the status of the surrounding areas (A, B, C, D, E, F, G and H) as they existed before the iteration, but also the resulting status of those areas that have been previously tested for connectivity in the current stage of the iteration. In FIGURE 5 this resulting status is defined as A′, B′, C′ and D′ in the column of Boolean functions and by small arrows in the connectivity conditions diagrams. In order that the functions and diagrams in FIGURE 5 will be readily understood an example will be described using the function $BG(D'+E)$. In the functions, the symbol "+" indicates the Boolean "or," and a bar above an expression indicates the negation of the function. An "and" condition is shown by parentheses or by the absence of any symbol. Thus, the example function corresponds to the condition where the point ($x$) being interrogated for connectivity lies between two points B and G (to the left and right of $x$) and the function states that $x$ is necessary for connectivity if neither D' nor E (the points below and above) is present. Obviously, if the point D has been retained by an earlier operation during the present iteration, the point $x$ is not necessary for connectivity. Similarly, if the point E is present, the point $x$ is not necessary for connectivity. Thus, if either D' or E are present, $x$ is not a connectivity point and the function $BG(D'+E)$ is zero. Most of the Boolean functions correspond to several possible ("or") conditions and the connectivity condition diagrams show each of these conditions. Boolean statements can generally be written in several forms for any given condition and those shown in FIGURE 5 are considered to be relatively economical to embody, and not necessarily the simplest for purposes of description. For example, the first Boolean function $AC\overline{B'(D'GE)}$ is a simple description of the three connectivity conditions that are shown and for simplicity of understanding could be rewritten as $$AC\overline{B'D'} + AC\overline{B'G} + AC\overline{B'E}$$

using well-known substitutions. Similarly, the example function could be rewritten as $BG\overline{D'E}$ to provide a more straight-forward correspondence to its associated connectivity diagram.

Figure 4E:
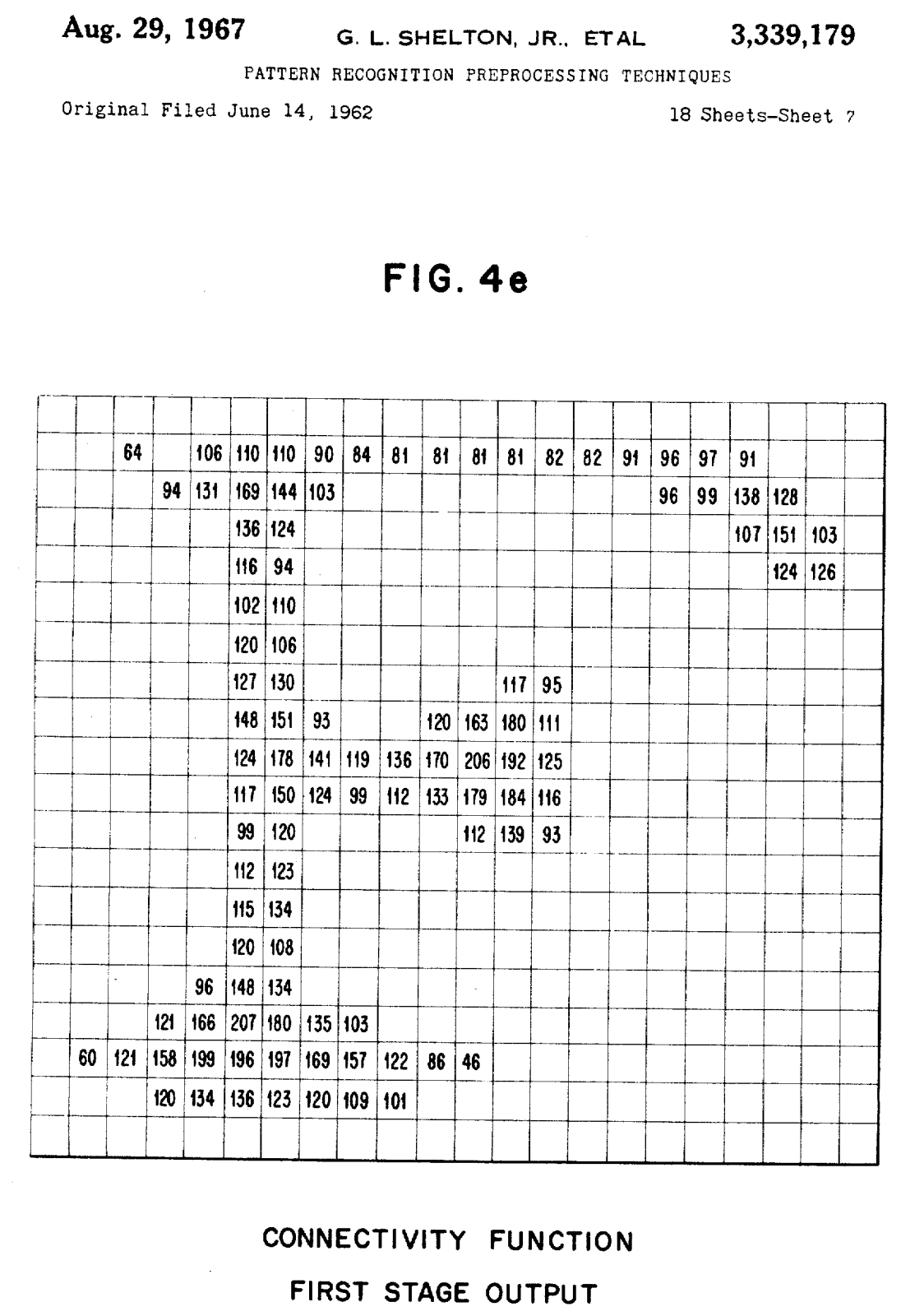

The preferred embodiment of the iterative connectivity function 16 is shown in detail in FIGURE 6. The analog signal from the highest-order circuit of FIGURE 1 [$q^{(n)}(x,y)$] is applied through a gated amplifier 15 and a threshold circuit 17 to the input of a shift register 19. This shift register and shift registers 21, 23 and 25 are each reset by signals on their reset lines prior to operation. Timing pulses on a lead 27 are used to synchronize the shifting of the data in the shift registers 19, 21, 23 and 25; and, after a short delay (in a delay circuit 31), the operation of gated amplifier 15. In this manner, the time-varying function $q^{(n)}(x,y)$ is sampled by the gated amplifier 15 and applied through the threshold circuit 17 to the shift register 19 at times that are interspersed between shift pulses to the shift register. The $T_1$-input threshold circuit 17 has a "1" output when the $q^{(n)}(x,y)$ output signal exceeds or is equal to a predetermined threshold and a "0" output for signals below this threshold. The threshold is not critical and is set to a relatively low value. For example, if the function $q^{(n)}(x,y)$ is considered to range between 0 and 207 (as shown in the example of FIGURE 4d), and the function is operated on by the connectivity function in three sequential steps (as shown in FIGURES 4e, f and g), then the $T_1$-input threshold circuit 17 is set to a value below "one" and, thus, provides a binary "1" signal for each non-zero element of the function $q^{(n)}(x,y)$. A threshold circuit suitable for use as the $T_1$-input threshold circuit and all other threshold circuits shown in FIGURE 6 will be described in detail later with respect to FIGURE 9. Since the design and adjustment of these circuits are not critical, many of the well-known threshold circuits could be employed.

Shift register 19 generates the operating zone data referred to in FIGURE 5 on leads labelled $A_1$, $B_1$, $C_1$, $D_1$, $E_1$, $F_1$, $G_1$ and $H_1$. The reference area "$x_1$" is also shown to be generated to indicate its position relative to areas $A_1$–$H_1$. Since this data ($x_1$) is not required for the operation of the circuit, the $x_1$ lead from the shift register is unused. This data is in binary form because of the operation of threshold circuit 17. Since the elements of the function $q^{(n)}(x,y)$ are generated in the order that the specimen is scanned [a sequence of vertical lines (from bottom to top) starting from the left portion of the specimen], the operating zone areas A, B and C are sequentially scanned. Area D is scanned at a time after the scanning of area A corresponding to the time taken to scan one vertical line. Areas $x$ and E are scanned immediately after area D is scanned and areas F, G and H are subsequently scanned. Therefore, data indicative of area A progresses the furthest through shift register 19, the area B indication immediately follows the area A indication and the area C indication immediately follows the area B indication. A "break" 33 is shown in shift register 19 indicating that several register elements are not shown. The number of shift register elements is a function of the number of sampling points during each vertical sweep. For example, if the vertical sweep is repeated once for every twenty timing pulses, nineteen shift register positions are needed between the positions that generate $x_1$ and $B_1$ (or any two horizontally-adjacent positions) and the break 33 indicates that seventeen register positions are not shown. These seventeen positions could obviously be replaced by a lumped delay for circuit economy. The last data that is applied to the shift register 19 corresponds to operating zone areas F, G and H and the corresponding shift register positions are shown to be separated from the remainder of the shift registers by a break 35, which represents seventeen positions that are not shown. A shift register circuit suitable for use for the shift registers shown in FIGURE 5 will be described in detail later with respect to FIGURE 10.

The shift register 19 output data corresponding to the operating zone areas A through H is applied to a connectivity function circuit 37 along with data from the subsequent shift register 21 representing $A'_1$, $B'_1$, $C'_1$ and $D'_1$ (which are indicative of the result of previous operations during the present iteration on those operating zone areas that are scanned prior to the scanning of $x_1$). The connectivity function circuit will be described in detail later with respect to FIGURE 7. The presence of a connectivity function circuit 37 output indicates that whether $x_1$ is necessary for line continuity and is applied to an "or" gate 39. The two remaining inputs that are applied to this "or" gate are indicative of the intensity range of area $x_1$. A fixed delay 41, equal to the time required for scanned data ($x_1$) to reach shift register position $x_1$, supplies an analog signal indicative of the value of area $x_1$ to a $T_1$-low threshold circuit 43 and a $T_1$-high threshold circuit 45. These circuits provide binary output signals that are indicative of the relative value of area $x$ with respect to predetermined thresholds. The $T_1$-low circuit 43 is adjusted to provide a binary "1" output signal where the value of point $x_1$ exceeds the lowest bound of the operating range of the first iteration and the $T_1$-high circuit 45 provides a signal when the intensity of $x_1$ exceeds the upper bound of this range. With respect to the example shown in FIGURE 4d where values vary from 0 through 207, the $T_1$-low circuit is adjusted to a value below "1" and the $T_1$-high circuit is adjusted to approximately 89. The $T_1$-low threshold circuit 43 output is inverted in circuit 44 (to provide a "1" signal when the value of $x_1$ is below its threshold) and applied to "or" gate 39. The output of the $T_1$-high circuit 45 is applied directly to the "or" gate. Thus, the "or" gate provides a "1" output signal when the area $x_1$ is necessary for connectivity or the value of point $x_1$ is outside of the range of the first iteration (below the threshold of the $T_1$-low circuit 43 or above the range of the $T_1$-high circuit 45). The "or" gate output controls an "and" gate 47 which, when conditioned, passes a timing pulse from delay 31 to control the sampling time of a non-inverting gated amplifier 49. The analog intensity signal from delay 41 is thus passed by amplifier 49 when area $x_1$ is to be retained by the first iteration. This signal is blocked by amplifier 49 when the intensity of area $x_1$ is within the operating range of the first iteration and is not necessary for connectivity. Thus the output of amplifier 49 (as shown in FIGURE 4e) represents the analog signal from gated amplifier 15 with certain portions of this analog signal reduced to zero. The portions that are deleted correspond to those elements of the function $q^{(n)}(x,y)$ which have values between the thresholds of the $T_1$(low) and $T_1$(high) threshold circuits 43, 45 and which are not necessary to preserve line continuity.

The circuits for the second and third iterations of the connectivity function on the function $q^{(n)}(x,y)$ are shown in FIGURES 6b and 6c and are similar in function to the circuit described for the first stage of the iteration. The same reference numerals have been used for similar portions of the circuits. Some threshold circuits are adjusted to different values for the different stages of iterations and correspond to the predetermined ranges of operation of each iteration. For example, using the data shown in FIGURE 4d, the $T_2$-low threshold circuit 43 and the $T_2$-high circuit 45 are set to approximately "89" and "129" respectively, and the $T_n$-low threshold 43 circuit and the $T_n$-high threshold circuit 45 are set to approximately "129" and "250," respectively. With respect to this example, the $T_2$ input, $T_n$ input and $T_{n+1}$ input threshold circuits 17 are adjusted to the same value as the $T_1$-input threshold circuit 17. All input threshold circuits could obviously be eliminated and their function incorporated into the scanner threshold circuit 9 in FIGURE 1, but this change would decrease the system versatility. With respect to the example shown in FIGURE 4e, f and g, only three stages of iteration are used and the "nth" stage is fed by the 2nd stage, but is designated "n" to make the circuit in FIGURE 6 obviously extendable to any number of stages.

The output of the nth-stage gated amplifier 49 (FIGURE 6c) is applied to a recognition circuit (not shown) through a threshold circuit 50, which converts the analog signal into binary black-white data corresponding to the output pattern, as shown in FIGURE 3.

The shift registers (21, 23) in all stages above the first stage differ from the first stage register 19 because they are required to generate the A, B, C and D signals for the adjacent lower order connectivity function 37. The relative positions of the signals in the shift registers are illustrated in FIGURE 8. The data in the second-order shift register 21 ($A_2$ through $H_2$) is determined by the previous outputs of the first-order threshold circuit and the data in the highest-order shift register 23 is determined by the previous outputs of the second-order threshold circuit. Since the output of gated amplifier 49 (representing the $x$ position of a stage of iteration) provides the first output of the shift register in the next stage of iteration after passing through one element of the shift register, this output corresponds to the point (D) on the input matrix (FIGURE 8) that is one sampling interval prior to (below) the $x$ data. This output is also labelled $H_2$ to show its relative position in the second stage of iteration. Thus, in FIGURE 8, $H_2(D_1)$ is located directly below $x_1$ and $H_3(D_2)$ is located directly below $x_2$. Using this analysis and FIGURE 8 it may be seen that $A_1$ corresponds to $E_2$, $D_1$ corresponds to $H_2$, and B and C correspond to the two outputs of shift register 21 that follow to the (left of) $E_2$. The leads to the connectivity function circuit 37 are labelled with primes ($A_1'$, $B_1'$, $C_1'$ and $D_1'$) because they represent the points A, B, C and D after the effect of the operation of the first stage of iteration. Similarly $A_2'$, $B_2'$, $C_2'$ and $D_2'$ are generated by shift register 23. An additional shift register 25 is used in the same manner to generate $A_n'$, $B_n'$, $C_n'$ and $D_n'$ as shown in FIGURE 6c.

The connectivity function 37 shown in block diagram form in FIGURE 6 is shown in greater detail in FIGURE 7. The Boolean functions in FIGURE 5 form the basis for the logic circuitry in FIGURE 7 which can be seen to comprise well-known "and" gates (indicated as &), "or" gates, inverters (indicated as I), and non-inverting amplifiers. These circuits generate the Boolean functions as indicated at the outputs of the amplifiers. Since each Boolean function represents one or more connectivity condition, these functions are combined in "or" gates 115 and are passed through an amplifier 117 to an "or" gate 119. The connectivity functions shown in FIGURE 5 are modified by the use of a biased majority circuit 121 which provides an output when the number of inputs that are present exceeds a predetermined threshold. This modification insures that points that are surrounded by a large number of points are retained even though they are not necessarily connecting points. This additional feature has been found to provide enhanced results and was used in generating the patterns shown in FIGURES 4e, f and g, where any point surrounded by six or more points was retained. The output of the biased majority circuit 121 is also applied to "or" gate 119. The output signal from "or" gate 119 corresponds to the output of the connectivity function in FIGURE 6.

FIGURE 9 is a detailed diagram illustrating a threshold circuit that is suitable for use in the preferred embodiment of FIGURE 6. A transistor 151 is normally non-conducting due to a negative signal applied to its base region. In this case, the collector voltage is relatively high (positive). When the circuit input signal exceeds the threshold determined by the ohmic values of the input resistors, the transistor conducts and the collector voltage decreases. An inverter 154 reverses the collector voltage to provide a positive (binary "1") signal when the input signal exceeds the predetermined threshold and a zero (binary "0") signal when the threshold is not exceeded.

FIGURE 10 illustrates a shift register that is suitable for use in the diagram of FIGURE 6. This register is comprised of a series of shift register "sections" in tandem. A text entitled Arithmetic Operations in Digital Computers, authored by R. K. Richards and published in 1955 by the Van Nostrand Company contains a description of these and other shift register sections at pages 144–148. A reset input is applied to each flip-flop in the register. The data input to the shift register is applied serially to the set input of the lowest-order flip-flop. Shift pulses are applied to the shift register in between each input data bit. These pulses condition the "and" gates which cause the data stored in each flip-flop to be transferred to the next highest order flip-flop. Outputs are provided to indicate the data in the various orders of the register.

A biased majority circuit is illustrated in FIGURE 11 and is suitable for use in the connectivity function circuit 121 shown n FIGURE 7. This circuit is similar in operaton to the threshold circuit shown and described with respect to FIGURE 9, but has several binary inputs which are combined in a resistor network before application to the transistor 155. In this manner, a positive (binary "1") signal is generated when the sum of the binary inputs exceeds the threshold determined by the setting of a potentiometer 157.

The preferred embodiment of the invention that has been shown and described illustrates techniques for pre-processing a specimen pattern to provide an output pattern with enhanced characteristics. This resulting pattern is then applied to a recognition system which provides an indication of the identity of the specimen. The input specimen that was chosen to illustrate the invention is the representation of a two-dimensional binary character as obtained from a conventional thresholded scanning apparatus, but could obviously be replaced by any array of data. In accordance with the invention, the specimen is iteratively operated on by an incidence matrix to generate a multi-valued representation of the input specimen having relatively high values along the centers of lines and at intersection points and connecting points. This pattern may be interrogated for features of various types; and, in accordance with the detailed embodiment of the invention, the pattern is applied to an iterative connectivity function which generates a thin-line pattern that essentially follows the center line of the lines within the specimen. The resulting thin-line pattern is superior to the input pattern for recognition purposes because it is relatively invariant to intensity and line width. That is, specimens of various line widths and intensities are effectively normalized to a thin-line pattern which can then be identified by a relatively simple and economical recognition system.

While the invention has been particularly shown and described with reference to a preferred embodiment thereof, it will be understood by those skilled in the art that various changes in form and details may be made therein without departing from the spirit and scope of the invention.

What is claimed is:

1. An apparatus for operating on a data representation $f(x,y)$ of a relatively wide-line input pattern to generate a data representation of a thin-line output pattern comprising, in combination:

a first means for linearly combining a plurality of signals;

means for presenting the input data corresponding to a plurality of the points $(x \pm x_1, y \pm y_1)$ in the input pattern that suround a reference point $(x,y)$, for all reference points $(x,y)$, to the first linear combining means;

a first gating means responsive to the input data and responsive to the output of the first linear combining means for passing, as a first intermediate data representation of a first intermediate pattern, the output of the first linear combining means when the corresponding reference points $(x,y)$ assume a predetermined value;

a second means for linearly combining a plurality of signals;

means for presenting a first intermediate data corresponding to a plurality of the points $(x \pm x_1, y \pm y_1)$ in the first intermediate pattern that surround a reference point $(x,y)$ for all reference points $(x,y)$ to the second linear combining means;

a second gating means responsive to the first intermediate data and responsive to the output of the second linear combining means for passing, as a second intermediate data representation $q^{(2)}(x,y)$ of a second intermediate pattern, the output of the second linear combining means when the corresponding reference points $(x,y)$ assume a predetermined value;

threshold means for selecting those data elements in the second intermediate representation that have values in each of a plurality of non-overlapping ranges of values;

a first operating zone function generator for selecting a function of the data elements in the second intermediate representation which correspond to the area surrounding a reference data element in the second intermediate pattern for all such data elements;

a first connectivity function generator responsive to the data selected by the first operating zone generator, for providing an indication of the data elements in the second intermediate representation which are necessary to preserve line continuity in the corresponding second intermediate pattern;

a third gating means responsive to the threshold means and to the indication provided by the first connectivity function generator for providing a third intermediate data representation containing those data elements of the second intermediate representation which have values within the first range of values that are necessary to preserve line continuity;

a second operating zone function generator responsive to the third intermediate representation for selecting the data elements in this representation which correspond to the area surrounding a reference data element in the third intermediate pattern, for all such data elements;

a second connectivity function generator responsive to the data selected by the second operating zone function generator for providing an indication of the data elements in the third intermediate representations which are necessary to preserve line continuity in the corresponding third intermediate pattern;

and a fourth gating means responsive to the threshold means and to the indication provided by the second connectivity function generator for providing a representation containing those data elements in the third intermediate representation which have values that are outside of a range of values that is higher than the first range of values, and containing those data elements which have values within the higher range of values that are necessary to preserve connectivity.

2. An apparatus for operating on a time-varying representation of a two-dimensional input array $f(x,y)$ of valued elements, to generate a representation of an output array $q^{(2)}(x,y)$ containing indications of features in the input array comprising, in combination:

a first delay circuit responsive to the time-varying representation of the input array for simultaneously providing a plurality of time-related output signals corresponding to a reference element $(x,y)$ in the input array and to a plurality of elements $(x \pm x_1, y \pm y_1)$ in the vicinity of the reference elements, for all elements $(x,y)$ in the input array;

a first adder responsive to those output signals from the first delay circuit which correspond to elements in the vicinity of the reference element, for providing an indication of the sum of the values associated with these elements;

a first gating means responsive to the output of the input data and to the output of the first adder for passing the adder output when the corresponding reference elements assume a predetermined value, as a time-varying representation $q^{(1)}(x,y)$ of an intermediate array of valued elements;

a second delay circuit responsive to the output $q^{(1)}(x,y)$ of the first gating means for simultaneously providing a plurality of time-related output signals corresponding to a reference element $(x,y)$ in the intermediate array $q^{(1)}(x,y)$ and a plurality of elements $(x \pm x_1, y \pm y_1)$ in the vicinity of the reference element $(x,y)$ for all elements in the input array;

a second adder responsive to those output signals from the second delay circuit which corresponds to elements in the vicinity of the reference element, for providing an indication of the sum of the values associated with these elements;

a second gating means responsive to the intermediate data and to the output of the second adder for passing the adder output when the corresponding reference elements assume a predetermined value, as a representation $q^{(2)}(x,y)$ of an output array containing indications of features in the input array.

References Cited
UNITED STATES PATENTS

| | | | |
|---|---|---|---|
| 3,104,372 | 9/1963 | Rabinow et al. | 340—146.3 |
| 3,167,745 | 1/1965 | Bryan et al. | 340—146.3 |
| 3,177,469 | 4/1965 | Chow | 340—146.3 |
| 3,196,398 | 7/1965 | Baskin | 340—146.3 |

MAYNARD R. WILBUR, *Primary Examiner.*

DARYL W. COOK, *Examiner.*

J. SCHNEIDER, *Assistant Examiner.*